United States Patent
Marc

(10) Patent No.: US 9,163,758 B2
(45) Date of Patent: Oct. 20, 2015

(54) DEVICE FOR THE SECURED CONNECTION OF TWO END FITTINGS, PARTICULARLY OF A PIPE

(75) Inventor: Damien Marc, Nangis (FR)

(73) Assignee: JPB Systeme, Brie-Comte-Robert (FR)

( * ) Notice: Subject to any disclaimer, the term of this patent is extended or adjusted under 35 U.S.C. 154(b) by 127 days.

(21) Appl. No.: 13/884,535

(22) PCT Filed: Nov. 9, 2011

(86) PCT No.: PCT/FR2011/052612
§ 371 (c)(1),
(2), (4) Date: May 9, 2013

(87) PCT Pub. No.: WO2012/063000
PCT Pub. Date: May 18, 2012

(65) Prior Publication Data
US 2013/0221659 A1    Aug. 29, 2013

(30) Foreign Application Priority Data
Nov. 9, 2010    (FR) ...................... 10 59238

(51) Int. Cl.
F16L 27/00    (2006.01)
F16L 19/00    (2006.01)

(52) U.S. Cl.
CPC .................... F16L 19/005 (2013.01)

(58) Field of Classification Search
USPC .................... 285/282, 399, 403, 404, 276, 81
See application file for complete search history.

(56) References Cited

U.S. PATENT DOCUMENTS

| | | | | |
|---|---|---|---|---|
| 4,834,667 | A  * | 5/1989 | Fowler et al. | 439/321 |
| 5,145,394 | A  * | 9/1992 | Hager | 439/321 |
| 6,293,595 | B1 * | 9/2001 | Marc et al. | 285/92 |
| 6,857,665 | B2 | 2/2005 | Vyse et al. | |
| 7,625,164 | B2 * | 12/2009 | Rode | 411/246 |
| 2004/0017077 | A1 * | 1/2004 | Vyse et al. | 285/92 |
| 2006/0061094 | A1 * | 3/2006 | Vyse et al. | 285/282 |
| 2007/0035126 | A1 * | 2/2007 | Hickey et al. | 285/282 |
| 2011/0018257 | A1 * | 1/2011 | Jeon et al. | 285/303 |
| 2011/0278837 | A1 * | 11/2011 | Yamamoto et al. | 285/87 |
| 2012/0274064 | A1 * | 11/2012 | Moore | 285/398 |
| 2013/0147182 | A1 * | 6/2013 | Murphy et al. | 285/81 |
| 2014/0131994 | A1 * | 5/2014 | Holmen et al. | 285/47 |

FOREIGN PATENT DOCUMENTS

EP    1 571 385 A2    9/2005
WO    2004/010041 A1    1/2004

OTHER PUBLICATIONS

French Patent Office; Search Report in French Patent Application No. 10 59238 dated Jul. 11, 2011; 2 pages.
European Patent Office; Search Report in International Patent Application No. PCT/FR2011/052612 dated Jan. 18, 2012; 2 pages.

* cited by examiner

*Primary Examiner* — Aaron Dunwoody
(74) *Attorney, Agent, or Firm* — Wood, Herron & Evans, LLP

(57) ABSTRACT

The device connects a first end fitting to a second end fitting, particularly of a pipe. A nut is provided with a threaded bore into which the first end fitting is screwed along a longitudinal axis. In the tightened position, the first end fitting is axially stressed relative to the second end fitting housed in the nut. Rotation-proofing structure is provided between the nut and at least one of the first and second end fittings hereafter referred to as the locking end fitting. The rotation-proofing structure includes at least one strip arranged around the locking end fitting. The strip comprises at least one protrusion radially penetrating into at least one concavity.

25 Claims, 7 Drawing Sheets

DEVICE FOR THE SECURED CONNECTION OF TWO END FITTINGS, PARTICULARLY OF A PIPE

FIELD OF THE INVENTION

The invention relates to a connecting device between two end fittings, in particular end fittings of a pipe.

STATE OF THE ART AND PROBLEMS ARISING

The connecting device has the function of providing the mechanical connection by screwing of a first end fitting onto a second end fitting, and of avoiding the untimely unscrewing of the elements, in particular in applications where the elements are subjected in service to vibrations or jarring.

The invention relates more particularly but non-limitatively to the standardized end fittings of pipes to be connected, one of the end fittings having a nipple intended to be pressed into a corresponding flare of the other end fitting, for example a nozzle, under the tightening action of a nut being captive of one of the end fittings and engaging a thread formed on the other end fitting.

One of the end fittings to be connected can comprise an area provided with several concavities, this denoting any hollow form (with respect to a relief or to an outer surface of the end fitting) evenly distributed on its periphery over an angle of 360° about the longitudinal axis of the end fitting, said concavities being intended to receive anti-rotation means or at least being capable of slowing the relative rotation between the elements during untimely unscrewing. Connection devices are known that are provided with balls or mobile pistons capable of entering these concavities or emerging therefrom under the effect of a torque exceeding a given threshold, said means making it possible to oppose untimely rotation between the elements for torques below this threshold. However, these means are complex, costly, constituted by a large number of elements and involve lengthy and difficult assembly. Moreover, they can cause malfunctions in the event of breaking, for example a piece being trapped in one of the concavities which then prevents the intentional unscrewing of the elements.

According to U.S. Pat. No. 6,857,665 B2, a spring formed by a metal wire corrugated in a radial plane is lodged in an inner peripheral groove of the nut. In order to prevent untimely unscrewing, the lobes defined by the corrugations of the wire interfere with flutes formed around the extremity of the end fitting bearing the nut. The angular pitch of the lobes is different to that of the flutes. Thus, the lobes interfere in turn with a respective flute. Every time, a lobe that passes the apex of a flute is flattened and this results in the elongation of the circumferential dimension of the spring. This device does not allow effective locking because the angular pitch between two locking portions is extremely small and the variation in the energy of deformation of the spring between two locking positions is low. The groove must be relatively deep and weakens the nut.

PURPOSE OF THE INVENTION

The purpose of the invention is to overcome all or some of the aforementioned drawbacks.

SUBJECT MATTER(S) OF THE INVENTION

To this end, the subject matter of the invention is a device for connecting a first end fitting onto a second end fitting, in particular of a pipe, the device comprising a nut provided at a first extremity with a threaded bore into which is screwed the first end fitting along a longitudinal axis to a tightened position in which the first end fitting is subject to axial stress with the second end fitting received in the nut, said nut and the second end fitting being shaped to limit the axial displacement of the nut with respect to the second end fitting in the direction of screwing of the nut, characterized in that said device comprises anti-rotation means located between the nut and at least one of the first and second end fittings, called the locking end fitting, said anti-rotation means being constituted by at least one strip placed around the locking end fitting and extending over a determined angular sector about the longitudinal axis, said strip comprising at least one protrusion cut out of its thickness, which is capable of entering radially and elastically into at least one concavity, during the relative rotation between the nut and the locking end fitting, and emerging therefrom when a torque exceeding a predetermined threshold is applied between the nut and the locking end fitting, the strip and the concavity being respectively mounted and formed on the nut and on the locking end fitting or vice-versa.

Each strip of the device supports one or more protrusions and constitutes a one-piece means that is secure and not very costly to produce. The nut comprising one or more strips of this type is extremely compact and has a small radial space requirement since the strip is placed in the nut so as to present its (relatively small) thickness in the radial direction. Mounting each strip inside the nut is quick and easy. This device thus constitutes a particularly optimized self-locking connection means.

According to further advantageous features of the invention, the locking end fitting is the second end fitting.

According to still further advantageous features of the invention, the strip is mounted bowed inside the nut while the concavity is formed on the periphery of the locking end fitting.

According to still further advantageous features of the invention, the device comprises at least two strips, in particular made of metal, joining end-to-end at their extremities and extending globally over an angular sector of 360° about the longitudinal axis.

According to still further advantageous features of the invention, each strip comprises at its extremities a radial extension entering a corresponding aperture formed in the body of the nut, in order to prevent any relative rotation between the strip and the nut.

According to still further advantageous features of the invention, the nut comprises an inner groove receiving the strip.

According to still further advantageous features of the invention, each strip comprises an axial extension cooperating with at least one protuberance formed on the inside of the nut, in order to prevent any relative movement between the strip and the nut.

According to still further advantageous features of the invention, the axial extension comprises a region placed between two protuberances. This arrangement constitutes a means of bilateral locking in rotation.

According to still further advantageous features of the invention, the at least one protuberance is engaged in a window having a shape corresponding to the axial extension. This arrangement constitutes a means of bilateral locking in rotation, as well as a means of locking in translation.

According to still further advantageous features of the invention, the strip is mounted on a third cylindrical guidance area.

According to still further advantageous features of the invention, the nut comprises at least one inner notch allowing the at least one protrusion to move radially outwards in order to emerge radially from the at least one concavity.

According to still further advantageous features of the invention, each protrusion is delimited by a generally U-shaped cutout, the protrusion being obtained by embossing, into a spherical shape, the material situated between the arms of the U, in the direction of the longitudinal axis. The spherical shape of the protrusions makes it possible to control and move smoothly over the sticking points generated during the rotary movement between the nut and the locking end fitting (by a slope effect at the base of the spherical shapes), when a torque above a given threshold is applied. This capability is present not only in rotation, but also in translation along the longitudinal axis of the nut and the locking end fitting, when it is necessary to slide the locking end fitting inside the nut in order to put sealing means in place. In the latter case, the adjustment between the locking end fitting and the nut requires that the anti-rotation means move easily and smoothly over the obstacles on the outer shape of the locking end fitting (shoulder, etc.).

According to still further advantageous features of the invention, as each cutout is generally U-shaped, the extremities of the arms of the U open out into holes provided through the strip (14).

According to still further advantageous features of the invention, the device comprises between four and eight protrusions distributed over an angular sector of 360° with respect to the longitudinal axis, and between eight and fourteen concavities shaped for receiving said protrusions.

According to still further advantageous features of the invention, the strip has a thickness less than 5 mm, for example from 1 to 2 mm, and each protrusion reaches a height of less than 5 mm with respect to an adjacent area of the strip, this height being for example comprised between 1 and 2 mm.

According to still further advantageous features of the invention, each aperture is produced so as to open out between the inside and the outside of the nut, the area opening to the outside being closed by a weld bead, in particular for sealing purposes.

According to still further advantageous features of the invention, each protrusion is supported by a tab delimited by a generally U-shaped cutout, the free extremity of the tab being curved so as to present a boss facing the side opposite the protrusion.

According to a further aspect of the invention, the subject matter of the invention is an end fitting for implementing a connecting device according to any one of the previous claims, characterized in that it comprises concavities having the form of faces arranged in the shape of a polygon.

BRIEF DESCRIPTION OF THE DRAWING

The invention will be better understood on reading the following description of a non-limitative embodiment of the invention and in the light of the attached drawings, in which.

DETAILED DESCRIPTION

As these embodiments are in no way (imitative, it is possible in particular to envisage variants of the invention comprising only a selection of features described below, in isolation from the other features described, if said selection of features is sufficient to confer a technical advantage or to differentiate the invention with respect to the state of the prior art. The selection comprises at least one, preferably functional, feature without structural details, or with only some of the structural details if this part only is sufficient to confer a technical advantage or to differentiate the invention with respect to the state of the prior art.

Figure 1:
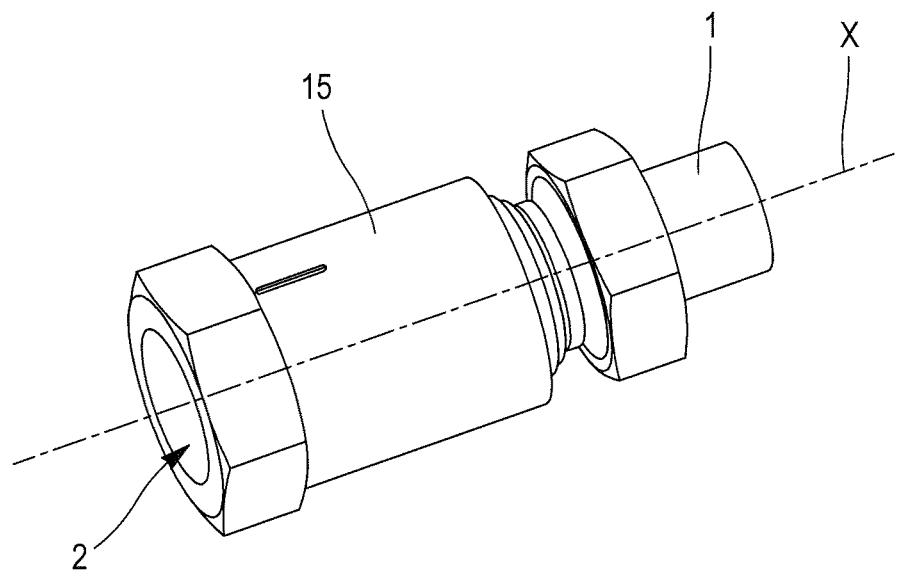
FIG. 1 shows a perspective view of the connecting device according to a first embodiment of the invention mounted on the first and second end fittings.
Figure 2:
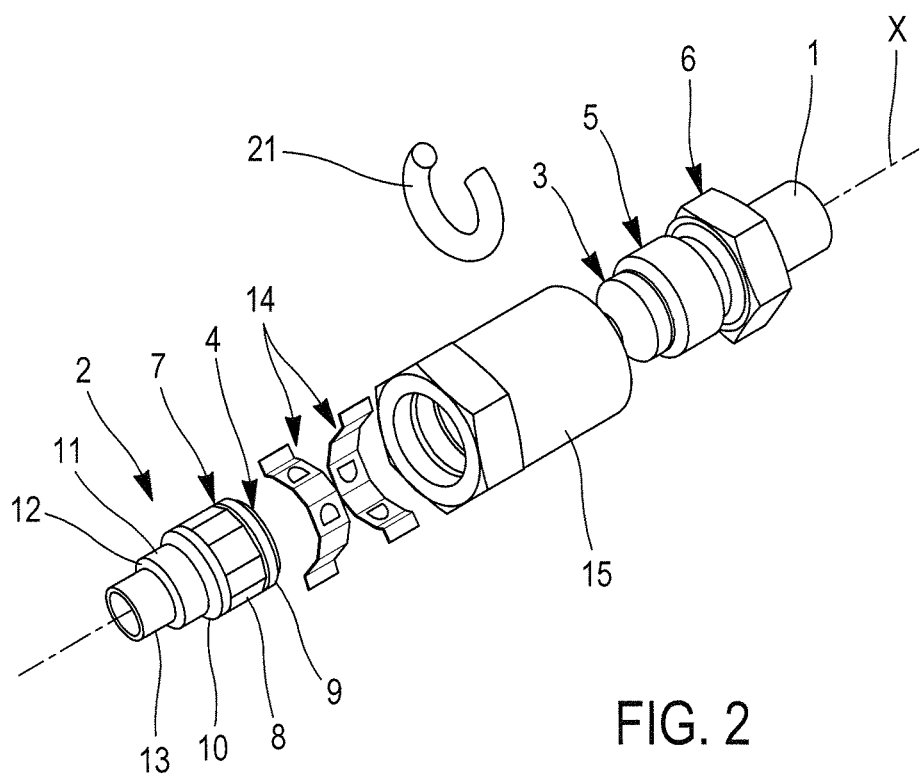
FIG. 2 shows an exploded perspective view of the device in FIG. 1 and of the end fittings.

FIGS. 1 and 2 show a connecting device between a first end fitting 1 and a second end fitting 2 which are typically end fittings mounted on sections of a pipe connected together. The end fittings are therefore hollow in order to ensure the continuity of the pipe. The assembly extends along a longitudinal axis X.

The first end fitting 1 comprises a nipple 3 having an ovoid shape intended to be pressed into a tapered flare 4 of the second end fitting 2, said assembly being intended to provide a sealed connection between the two end fittings 1, 2.

Starting from the nipple 3, the first end fitting 1 comprises a male thread 5 then a flange bearing on its periphery a rotation drive configuration 6 such as a hexagonal configuration.

Figure 3:
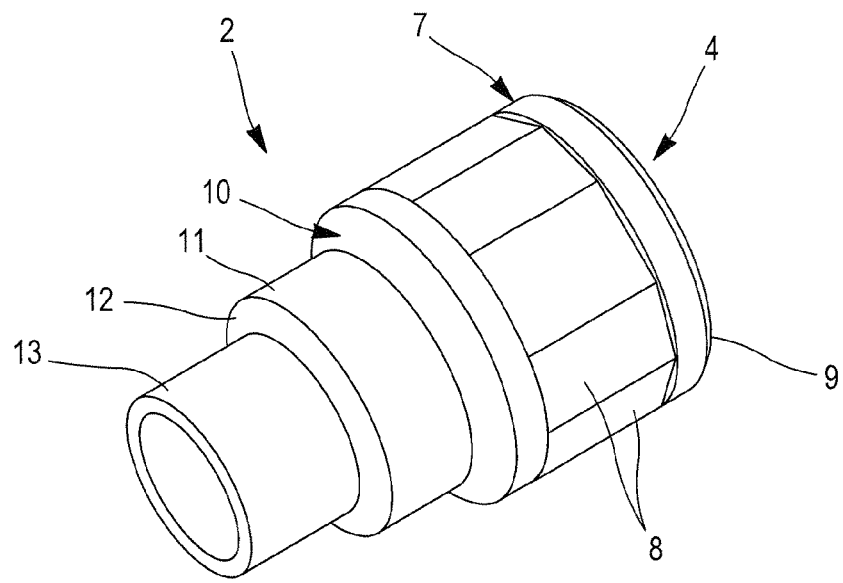
FIG. 3 shows a perspective view of the first end fitting in FIG. 1, FIGS. 4 and 5 are respectively perspective and plan views of a strip according to the first embodiment of the invention provided with protrusions according to the invention.
Figures 4, 5:
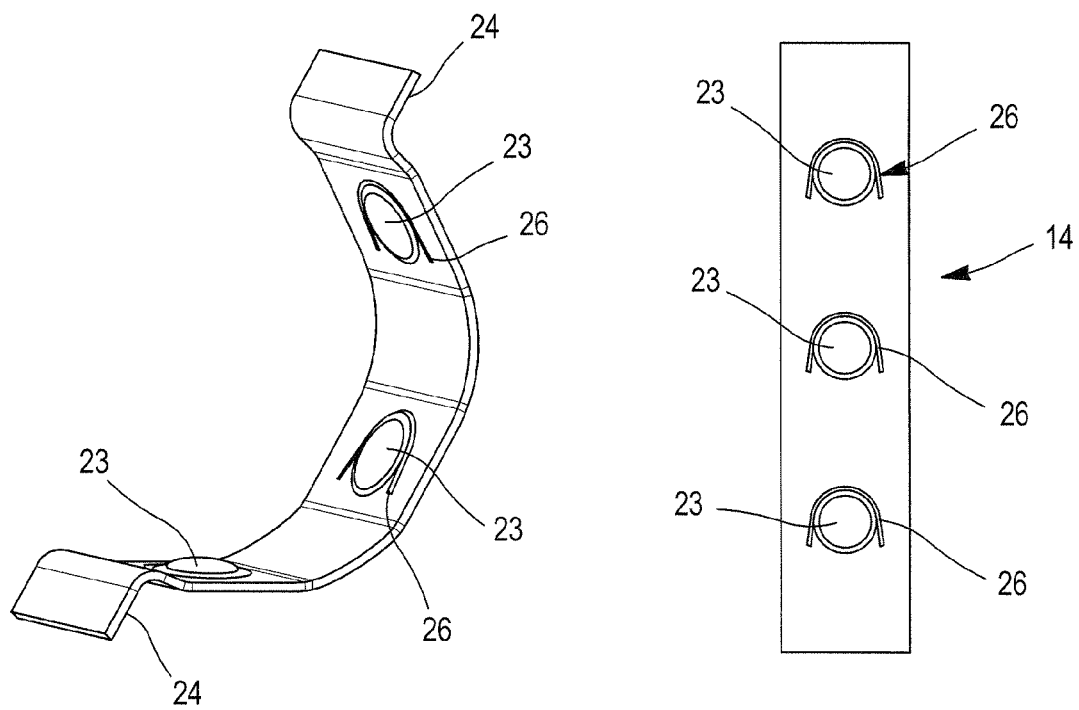

The second end fitting 2 comprises a cylindrical outer shape 7 provided with several concavities 8 angularly distributed on the periphery of the second end fitting, about the longitudinal axis X. These concavities denote any form that is hollow with respect to a relief (edges, teeth, notches) or an outer surface of the end fitting: in the example shown, these concavities have the form of faces arranged in a polygonal shape (in particular hexagonal, octagonal, or decagonal): the concavity is formed by a central area of each face that is set back towards the axis of the end fitting with respect to the edges of the polygon and with respect to the cylindrical outer surface 7 of the end fitting 2. In variants of the invention (not shown), the concavities can have diverse forms, such as flutes having various profiles extending along the longitudinal axis of the end fitting. An example variant is given below with reference to FIG. 14. The concavities are intended to accommodate anti-rotation means 14 (FIGS. 4 and 5) which are described hereafter. At its extremities, the second end fitting 2 comprises for example a bevel 9, as provided at a first extremity facing the first end fitting 1, or a more complex rotational form, provided with one or more concave toroidal forms(s) intended to cooperate in contact with one or more o-ring seal(s) and/or forming a stop, of one or more cylindrical or frustoconical area(s). In the example shown in FIGS. 2 and 3, the second end fitting 2 comprises successively, from the cylindrical outer shape 7 away from the first extremity, a concave toroidal surface 10, a cylindrical segment 11, and a frustoconical area 12 and a cylindrical segment 13. In a variant, (not shown), a single cylindrical or frustoconical segment can be provided connecting to the cylindrical outer shape 7 via the concave toroidal surface. The cylindrical outer shape 7 is the portion of the second end fitting 2 having the greatest diameter.

The first end fitting 1 is fitted onto the second end fitting 2 via a nut 15 that is installed and made captive on the second end fitting 2, while being screwed onto the male thread 5 of the first end fitting 1.

Figure 6:
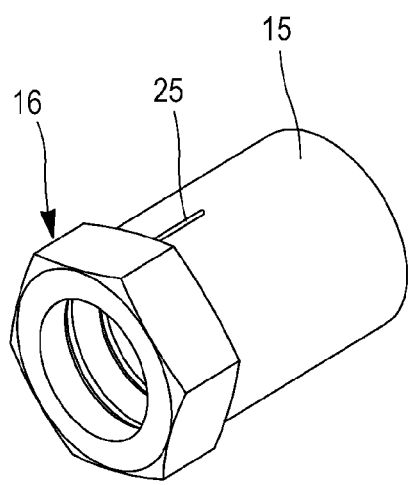
FIGS. 6 and 7 are respectively external and longitudinal cross-sectional perspective views of the nut according to the first embodiment of the invention.
Figure 7:
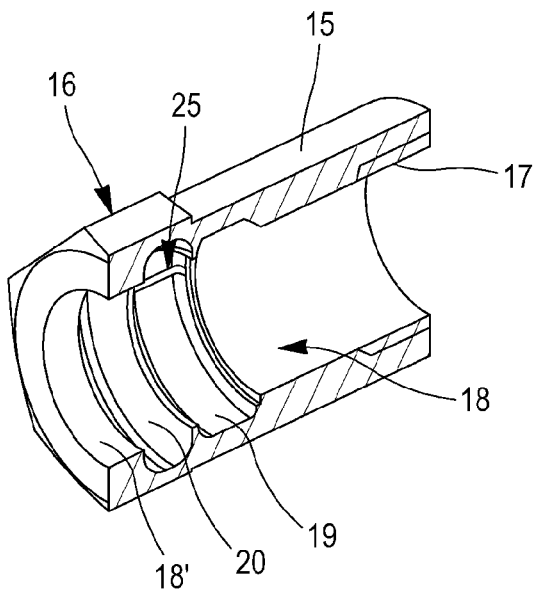
Figure 8:
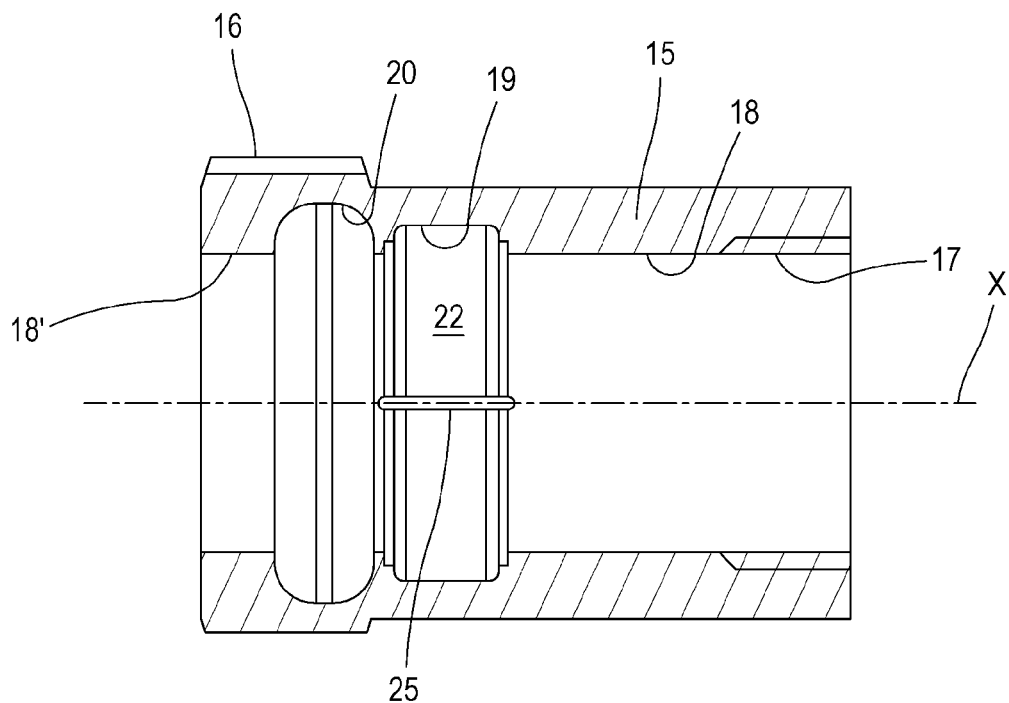
FIG. 8 is a longitudinal cross-sectional plan view of the nut in FIGS. 6 and 7.

As shown in FIGS. 6 to 8, the nut 15 has a generally rotational shape comprising on its periphery a rotation drive configuration 16, typically a hexagonal shape, allowing the nut 15 to be driven in rotation using a suitable tool, for the purpose of screwing it onto the first end fitting 1 while the latter is immobilized in rotation using a tool suitable for the rotation drive configuration 6 of the first end fitting 1. The rotation drive configuration 16 of the nut 15 is situated at one extremity of the nut, for example the extremity remote from the first end fitting 1 as shown in the figures.

The nut comprises an inner bore in which several functional areas are successively identified, starting from its extremity facing the first end fitting 1 and continuing towards its opposite extremity: an inside thread 17 of the nut cooperating with the male thread 5 of the first end fitting 1, a first cylindrical guidance area 18 substantially following the cylindrical outer shape 7 of the second end fitting 2 in order to ensure satisfactory positioning and guidance of the nut 15 on said second end fitting 2, a first groove 19 for receiving the anti-rotation means 14 which will be described hereinafter, a second groove 20 having a toroidal shape for receiving an o-ring seal 21 (FIGS. 2, 11 and 12), and a second cylindrical guidance area 18' having a diameter substantially equal to the first cylindrical guidance area 18.

The first groove 19 comprises a cylindrical base 22. This groove receives anti-rotation means 14 constituted by one or more identical strips made of metal (FIGS. 4 and 5) configured according to an annular and cylindrical pattern, to be placed at the base of the groove 19 around the second end fitting 2. These strips are formed from sheet metal or flat-band steel. The width or height of the strips along the longitudinal axis X is less than the dimension of the form in the same direction. In the example described, two metal strips 14 are provided having a thickness typically less than 5 mm, for example of the order of 1 to 2 mm. In variant embodiments of the invention (not shown), three or more strips can be provided, or even a single strip open on its periphery, for the purpose of insertion into the nut and positioning in the groove 19. When several strips are provided, the latter are placed end-to-end, extending globally over the periphery of the second end fitting 2, over an angular sector of 360°. The strips 14 are placed in the groove 19 so as to be fully accommodated (with the exception of the protrusions 23 described hereinafter), in the direction of their thickness, in the depth of the groove 19, i.e. in a radial direction with respect to the longitudinal axis X. The strips 14 are therefore (with the exception of said protrusions 23) substantially flush with the cylindrical guidance areas 18 and 18'.

The strips 14 comprise at their ends radial extensions 24 directed towards the outside of the nut 15 and intended to be inserted into apertures 25 of conjugate shape formed in the body of the nut 15. In the example shown, where two strips 14 are provided, two apertures 25 are situated in the base 22 of the groove 19, in a diametrically opposed manner. Each of these apertures 25 accommodates the two respective juxtaposed extensions of the two strips 14 placed end-to-end, in order to ensure their correct positioning in the groove 19 and secure them in rotation with respect to the nut 15. It is of the utmost importance that these strips 14 do not rotate with respect to the nut 15 while it is being screwed onto the first end fitting 1.

According to an essential aspect of the invention, the strips 14 comprise cutouts 26 forming protrusions 23 in the direction of the second end fitting 2. These protrusions 23 are intended to enter radially and elastically into the concavities 8 of the second end fitting 2 when the angular positions of the two elements 2, 15 coincide. The end fitting 2 thereby constitutes a locking end fitting in the sense that it slows and/or prevents the rotation of the nut 15, below a determined torque, so as to prevent any untimely unscrewing. The protrusions 23 act like elastic lugs opposing any divergence from their natural position engaged in the corresponding concavities. A torque exceeding a predetermined threshold must be applied to the nut with respect to the second end fitting 2 for the purpose of intentionally unscrewing it, which then causes the protrusions to diverge from their engaged position and allows the rotation of the nut. Continuing this rotation by a further angle, each protrusion again finds itself opposite a concavity of the second end fitting, involving its elastic return to an engaged position, and so on.

The protrusions 23 are typically formed by embossing the material delimited by generally U-shaped cutouts, and more precisely material situated between the lateral arms of the U. The protrusions have a spherical shape so as to facilitate their emergence from the concavities (by a slope effect, when the edges of the concavities 8 come into contact with the spherical base of the corresponding protrusion and then slide on the spherical surface of this protrusion, causing its radial displacement). The height of the protrusions with respect to the adjacent surface of the strip 14 is for example 1 to 2 mm, and preferably does not exceed the thickness of the strip 14.

Provision is made for example for between eight and fourteen concavities evenly distributed on the periphery of the second end fitting 2, and between four and eight protrusions evenly distributed over an angular sector of 360°. In the case shown on FIGS. 4 and 5, where two strips 14 are provided, each strip supports for example three protrusions, bringing the total to six protrusions 23 around the second end fitting 2.

Figure 11:
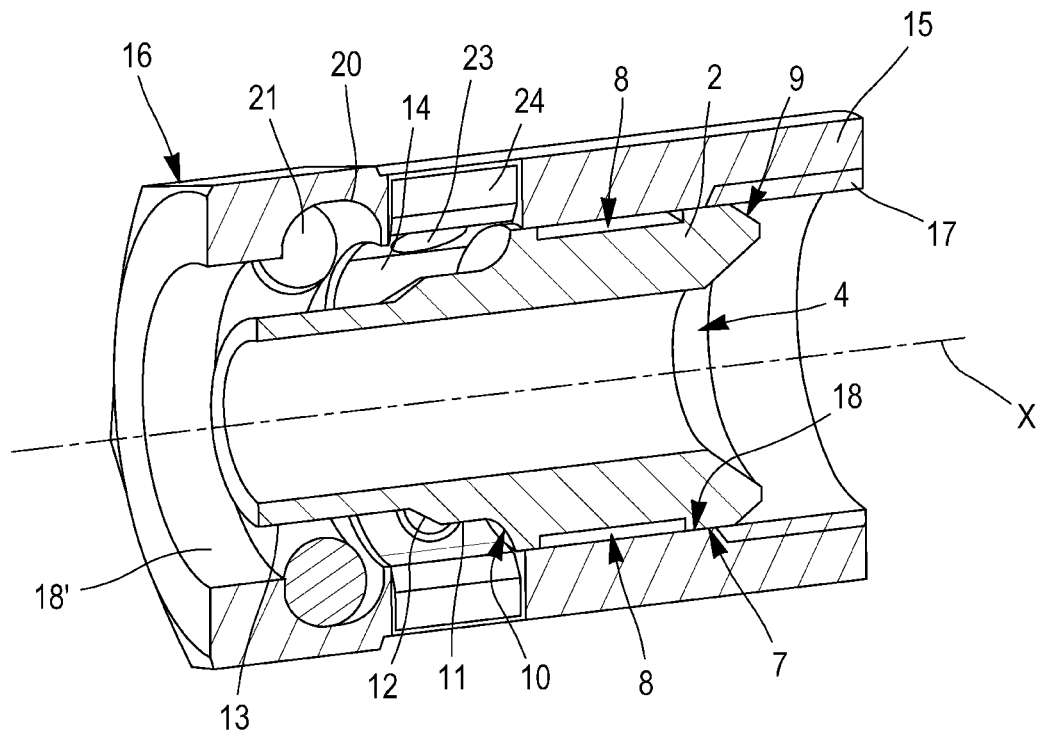
Figure 12:
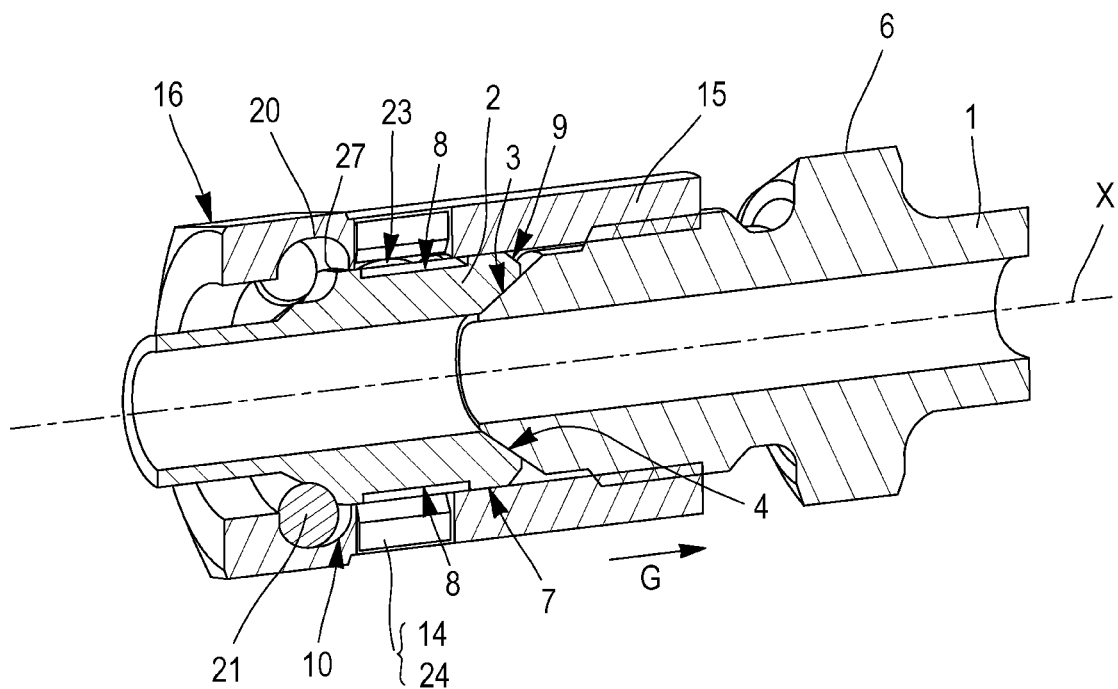

A description will now be given of the method of assembling the nut and connecting the end fittings 1, 2 with reference to FIGS. 10 to 12.

The nut 15 is installed following the arrow F (FIG. 10) onto the second end fitting 2, via the free extremity of the latter, which is facing the first end fitting 1 to be connected. It is assumed that the other extremity of the second end fitting 2 is connected to a pipe section, which prevents the mounting of the nut 15 from this side. The nut 15 is guided onto the second end fitting 2 by the cylindrical guidance areas 18 and 18' of the nut 2 and the cylindrical outer shape 7 of the second end fitting 2, which are adjusted in relation to each other and cooperate in mutual contact. During the movement of the nut following the arrow F, the strips 14 and their protrusions 23 surmount discontinuities in the shape of the second end fitting 2, for example the bevel 9 situated at the first extremity of the second end fitting, as well as the concavities 8. The strips 14 are in fact fully accommodated in the body of the nut 15 and are substantially flush with the cylindrical guidance areas 18, 18'. The protrusions 23 diverge radially from their natural position under the force of the outer surface of the second end fitting 2, so as to allow the nut 15 to advance following the arrow F. When the nut 15 reaches an axial position that is sufficiently advanced with respect to the second end fitting 2 (FIG. 11), and an extremity of the nut 15 remote from the first end fitting 1 is substantially in vertical alignment with the second extremity of the second end fitting 2, which comprises a smaller diameter in comparison with the outer cylindrical surface 7, a space becomes free and allows the insertion of an o-ring seal 21 into the nut 15, so that it can be positioned in the second groove 20. This seal 21 is open on its periphery for its installation around the second end fitting 2.

This seal 21 constitutes not only a sealing means for the assembly but also forms a stop making the nut 15 captive on the second end fitting 2. The seal is formed in order to follow the concave toroidal shape 10 made on the second end fitting 2 when the nut 15 is moved in the opposite direction, i.e. in the direction of the arrow G (FIG. 12). The nut 15 therefore cannot be separated from the second end fitting 2 while the nut 15 is being screwed onto the first end fitting as shown in FIG. 12. The nut therefore moves with respect to the second end fitting following the arrow G, being pushed against by the first end fitting 1 during the screwing process, to a final tightened position in which the second end fitting 2 is stressed both by the o-ring seal 21 and by the first end fitting 1. During this movement following the arrow G, the protrusions 23 again surmount discontinuities in the shape of the outer surface of the second end fitting 2, for example the edge 27 joining the concave toroidal shape 10 and the outer cylindrical guiding surface 7. In the final tightened position shown in FIG. 12, the protrusions are situated axially in line with the concavities 8, and at least some of them, by returning elastically to their natural position, enter the corresponding concavities of the second end fitting. The connection thus made is secured against untimely unscrewing.

Figure 9:
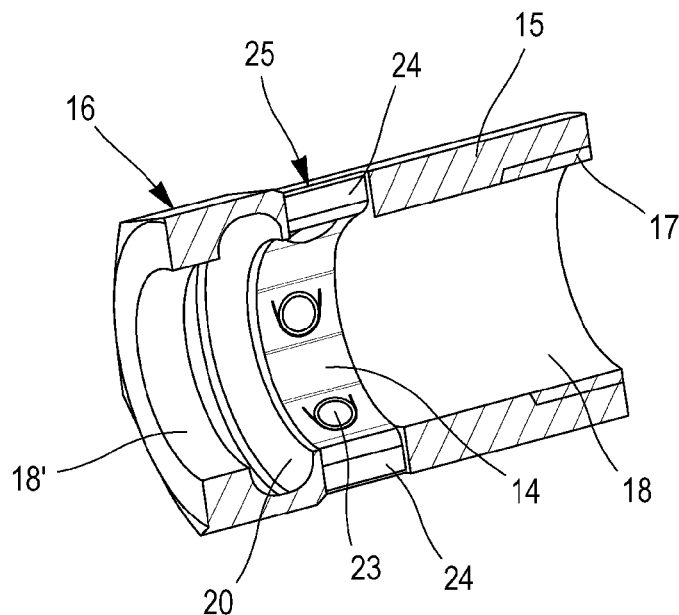
FIG. 9 is a perspective view in longitudinal cross section of the nut according to the first embodiment of the invention, in which is mounted a strip according to the invention.
Figure 10:
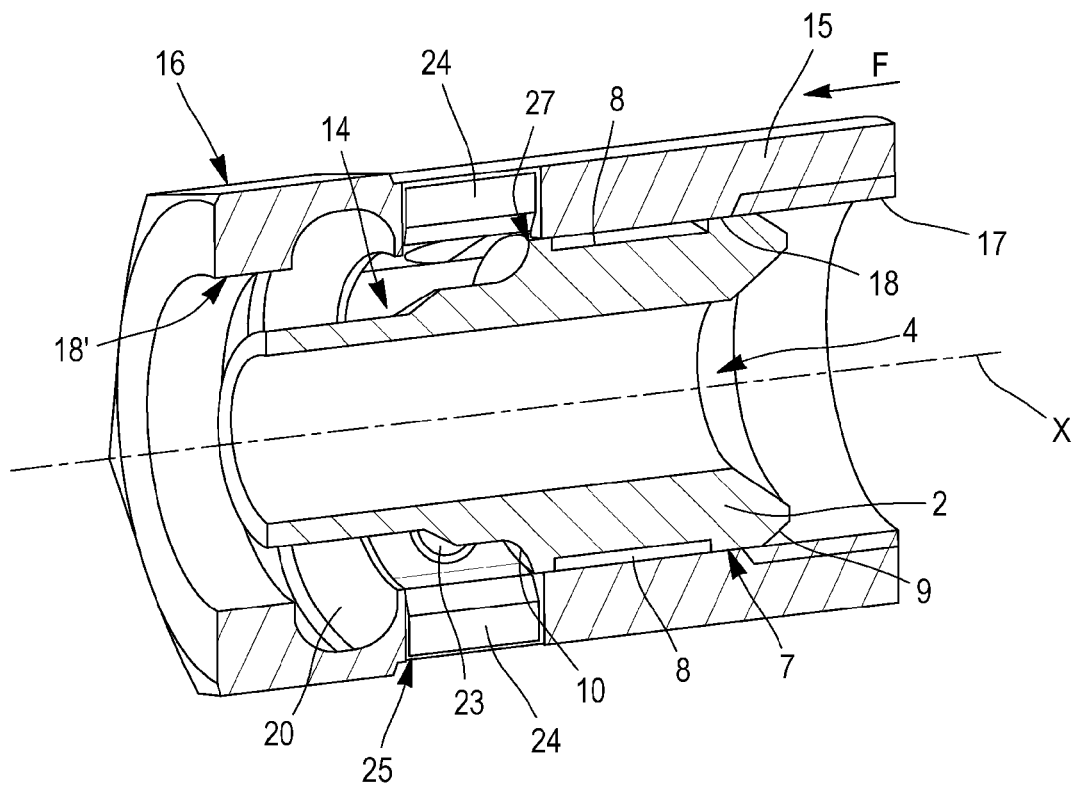
FIGS. 10 to 12 show chronological views of the method of assembly and installation of the connecting device according to the first embodiment of the invention on the two end fittings.

The apertures 25 receiving the extensions 24 of the strips are shown opening out onto the outside of the nut (FIGS. 9 and 10). In order to seal the assembly, the apertures 25 can be closed from the outside of the nut by a weld bead.

In the second embodiment, the elements having similar structures and functions have references increased by 100 with respect to the first embodiment.

Figure 14:
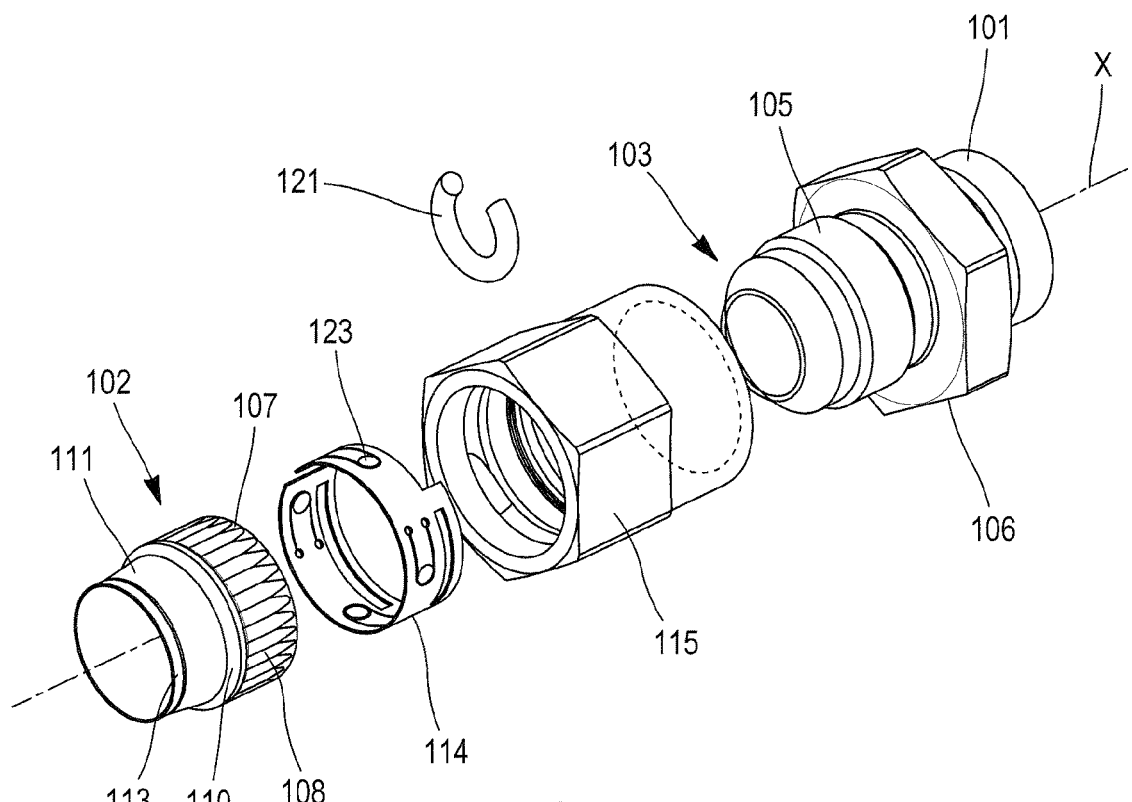
FIG. 14 shows an exploded perspective view of the connecting device according to a second embodiment of the invention, mounted on the first and second end fittings.
Figure 15:
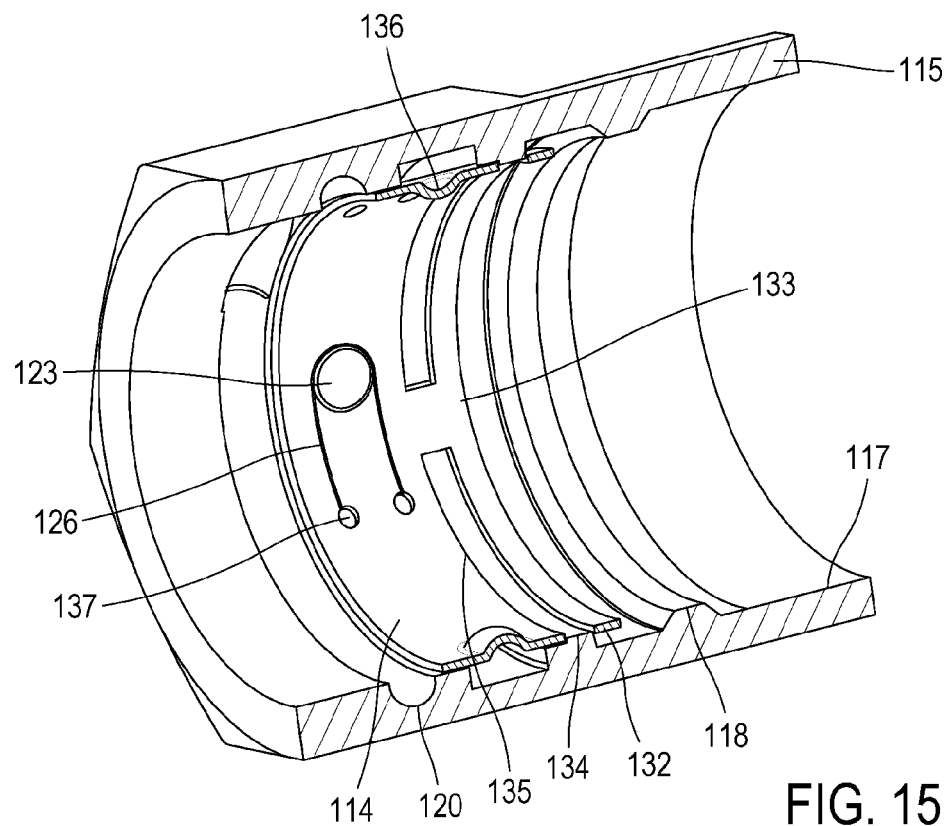
FIG. 15 is a longitudinal cross-sectional perspective view of the nut and of the strip according to the second embodiment of the invention.
Figure 16:
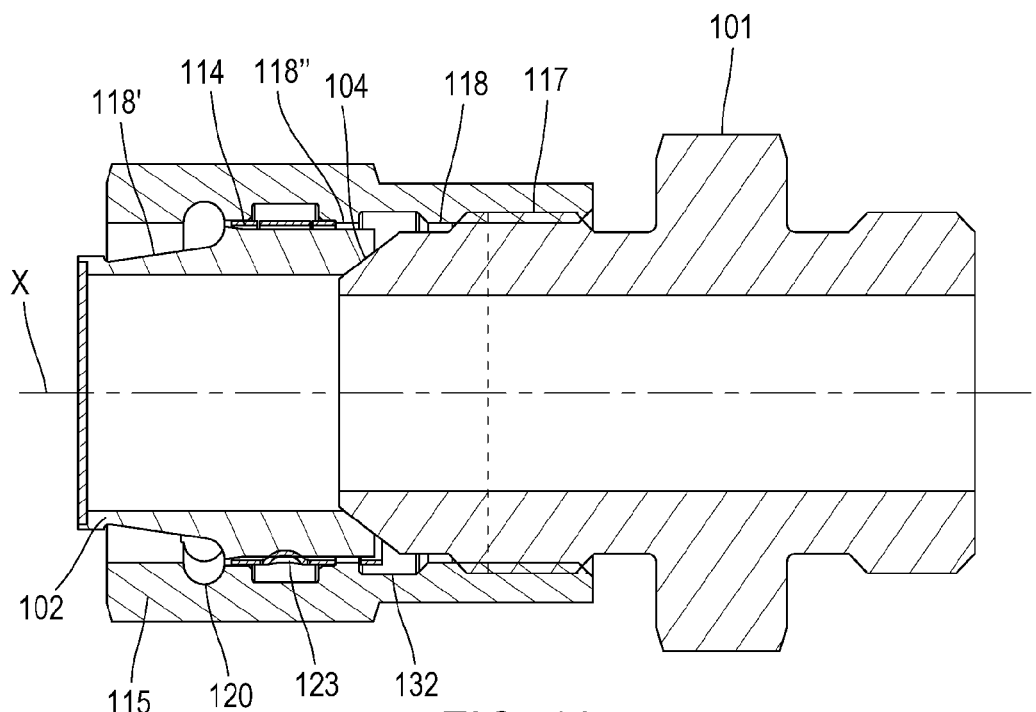
FIG. 16 is a longitudinal cross-sectional plan view of the connecting device in FIG. 14.

With reference to FIGS. 14 to 16, a second embodiment of the connecting device according to the invention will be described only to the extent that it differs from the first embodiment. In this second embodiment, the connecting device comprises substantially the same elements and a similar arrangement to that of the first embodiment. This embodiment includes both the first end fitting 101, the second end fitting 102 and the nut 115 provided with anti-rotation means constituted by at least one strip 114. The essential difference compared to the first embodiment lies in the fact that the strip is not mounted in a groove, but directly on a third cylindrical guidance area 118" defined between the first cylindrical guidance area 118 and the second cylindrical guidance area 118'. The third cylindrical guidance area 118" is separated from the first cylindrical guidance area 118 by a third groove 132, and from the second cylindrical guidance area 118' by the second groove 120.

The example shown in the drawings in FIGS. 14 to 16 comprises a single strip 114 which is open at a location on its periphery, so as to be inserted by radial elastic compression into the nut 115. The strip 114 released in the nut 115 retains a radial compression that allows the strip 114 to be held against the inside of the nut 115. The strip 114 moreover comprises at least one axial extension 133 cooperating with at least one protuberance 134 formed on the inside of the nut, at the same time allowing the axial positioning of the strip 114 in the nut 115 and preventing any relative rotation between the strip 114 and the nut 115. In the example shown, the strip 114 comprises no radial extension, and the nut 115 comprises no aperture. The protuberance 134 is positioned on the third cylindrical guidance area 118", and protrudes radially towards the inside thereof so as to be substantially flush with an inner face of the strip 114. In the example described, an axial extension 133 is provided, extending substantially in the axial continuation of the strip 114, and comprises orifices 135 having a shape complementary to that of the protuberances 134, which are three in number in the example. According to a feature, the at least one protuberance 134 is placed next to the third groove 132 in order to reduce the axial space requirement of the nut 115. In further variants (not shown), the at least one protuberance 134 is separate from the third groove 132.

The protuberance 134 can have different shapes. In the example described, in cross-section the protuberance has substantially the shape of a cylinder of axis X, said cross-section having an axial dimension smaller than its peripheral dimension, making it possible to space the anti-rotation means apart on the periphery of the third cylindrical guidance area 118" to prevent the axial extension 133 passing over the protuberance 134, and/or locking the second end fitting 102 in the nut 115 under the effect of the torque. This form of protuberance 134 makes it possible to stop the rotation of the strip 114 on the nut 115 for high torques without increasing the dimensions of the connecting device. In the example shown, the axial extension 133 comprises two orifices 135 each working together with a protuberance 134. In variants (not shown) an axial extension 133 can cooperate with two separate protuberances 134, in particular if the axial extension is T-shaped projecting axially from the strip 114 and has a form complementary to the parts of the protuberances 134 adjacent to the radial extension 133. In other variants (not shown), the strip 114 can comprise several separate radial extensions 133.

Moreover, as shown in FIGS. 15 and 16, the nut 115 can comprise at least one inner notch 136 allowing the at least one protrusion 123 to move radially outwards to emerge radially from the at least one concavity 108 during the rotation of the nut 115 on the second end fitting 102. In the example shown, a single inner notch 136 in the form of a groove is arranged in line with four protrusions 123. In variants (not shown), the nut 115 comprises several inner notches 136 each in line with a protrusion, the inner notches 136 having different possible shapes allowing the at least one protrusion 123 to emerge radially.

Provision is also made for the extremities of the arms of the U of each generally U-shaped cutout forming the protrusions 123 to open into holes 137 passing through the strip 114. The holes 137 allow in particular a better distribution of the mechanical stresses undergone by the strip 114 in order to reduce the elastic fatigue of the strip 114.

In the example in FIG. 14, the end fitting 102 comprises several concavities 108 in the form of splines along the longitudinal axis of the end fitting, inset towards the axis of the end fitting with respect to the cylindrical outer surface 107 of the end fitting 102, said splines being open on the side of the end fitting 102 opposite the flare 104. Non-limitatively, the splines of the example in FIG. 14 are produced with a spherical milling cutter forming a spline in a segment of a circle in a plane of section normal to the longitudinal axis X.

Of course, the invention is not limited to the means that have just been described and includes all the technical equivalents.

In particular the different features, forms and variant embodiments of the invention can be combined with each other in various combinations insofar as they are not incompatible or mutually exclusive.

In particular, provision can also be made for the anti-rotation means to be provided between the nut and the first end fitting 1 (not shown). Provision can also be made for the strips to be mounted on one of the end fittings and for the protrusions to enter concavities formed on the nut.

Figure 13:
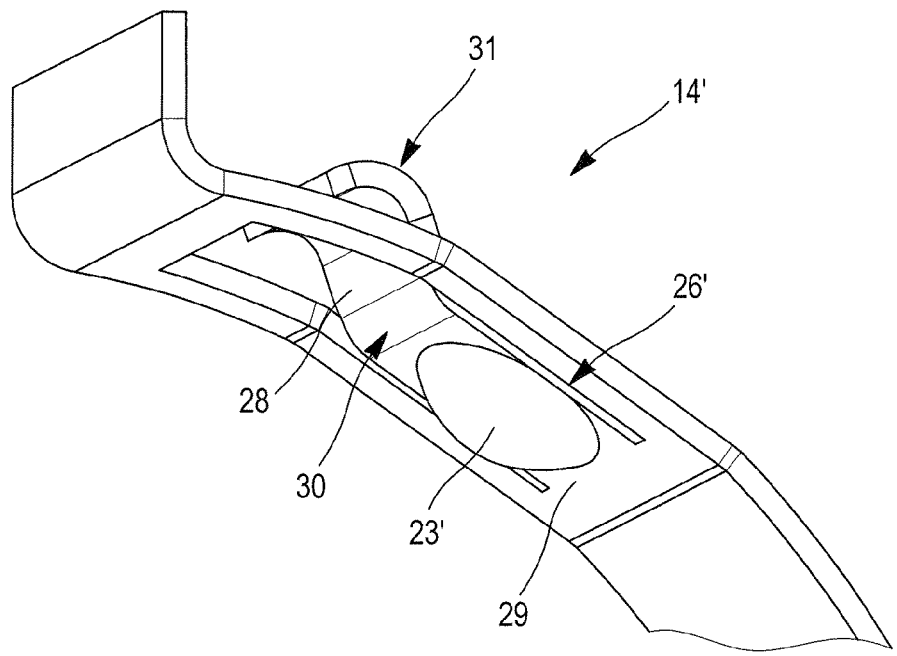
FIG. 13 shows a further embodiment of a strip according to the invention.

Moreover, as shown in FIG. 13, each strip 14' can have a protrusion 23' supported by a tab 28 itself delimited by a generally U-shaped cutout 26'. The free extremity of the tab 28 that is not supporting the protrusion 23' comprises in this example a curved shape via two successive folds, so as to present a boss facing the nut 15, on the opposite side to the protrusion 23'. The stiffness of each protrusion is thereby increased, due to the boss resting on the base 22 of the first groove of the nut 22. This option thus stresses three edges 29 (at the base of the tab 28), 30 (first fold, on the side of the protrusion 23') and 31 (second fold, on the side of the free extremity of the tab 28).

What is claimed is:

1. A device for the connection of a first end fitting onto a second end fitting, the device comprising:
    a nut provided at a first extremity with a threaded bore into which is screwed the first end fitting along a longitudinal axis to a tightened position in which the first end fitting is subject to axial stress with the second end fitting received in the nut,
    the nut and the second end fitting being shaped so as to limit the axial displacement of the nut with respect to the second end fitting in the direction of screwing of the nut, and
    anti-rotation structure located between the nut and at least one of the first and second end fittings, called the locking end fitting, the anti-rotation structure comprising at least one strip placed around the locking end fitting and extending over a determined angular sector about the longitudinal axis,
    the strip comprising at least one protrusion and a hole through the strip and surrounding a portion of the protrusion, whereby the protrusion is capable of entering radially and elastically into at least one concavity, during the relative rotation between the nut and the locking end fitting, and emerging therefrom when a torque exceeding a predetermined threshold is applied between the nut and the locking end fitting,
    the strip and the concavity being respectively mounted and formed on the nut and on the locking end fitting or vice-versa.

2. Connecting device according to claim 1, wherein the locking end fitting is the second end fitting.

3. Connecting device according to claim 1, wherein the strip is mounted bowed inside the nut while the concavity is formed on the periphery of the locking end fitting.

4. Connecting device according to claim 3, comprising at least two strips, joining end-to-end at their extremities and extending globally over an angular sector of 360 degree about the longitudinal axis.

5. Connecting device according to claim 4, wherein each strip comprises at its extremities a radial extension entering a corresponding aperture formed in the body of the nut, in order to prevent any relative rotation between the strip and the nut.

6. Connecting device according to claim 5, wherein each aperture is produced so as to open out between the inside and the outside of the nut, the area opening to the outside being closed by a weld bead.

7. Device according to claim 3, wherein the nut has an inner groove receiving the strip.

8. Connecting device according to claim 3, wherein the at least one strip comprises an axial extension cooperating with at least one protuberance formed on the inside of the nut, in order to prevent a relative movement between the strip and the nut.

9. Connecting device according to claim 8, wherein the axial extension comprises a region placed between two protuberances.

10. Connecting device according to claim 8, wherein the at least one protuberance is engaged in a window having a shape corresponding to the axial extension.

11. Connecting device according to claim 8, wherein the strip is mounted on a cylindrical guidance area of the nut.

12. Connecting device according to claim 8, wherein the nut comprises at least one inner notch allowing the at least one protrusion to move radially outwards in order to emerge radially from the at least one concavity.

13. Connecting device according to claim 3, wherein each protrusion is delimited by a generally U-shaped cutout, the protrusion being obtained by embossing, into a spherical shape, the material situated between the arms of the U, in the direction of the longitudinal axis.

14. Connecting device according to claim 13, wherein for each generally U-shaped cutout, the ends of the arms of the U open out into holes provided through the strip.

15. Connecting device according to claim 1, comprising between four and eight protrusions distributed over an angular sector of 360 degree with respect to the longitudinal axis, and between eight and fourteen concavities shaped for receiving said protrusions.

16. Connecting device according to claim 1, wherein the strip has a thickness less than 5 mm and in that each protrusion reaches a height of less than 5 mm with respect to an adjacent area of the strip.

17. Connecting device according to claim 13, wherein each protrusion is supported by a tab delimited by a generally U-shaped cutout, the free extremity of the tab being curved so as to present a boss facing the side opposite the protrusion.

18. An end fitting for implementing a connecting device according to claim 1, wherein the end fitting comprises concavities having the form of faces arranged in a polygonal shape.

19. An assembly for coupling first and second fluid conduits, the assembly comprising:
    a nut, comprising:
        a circumferential sidewall defining an inner surface and an outer surface,
        a recess in said inner surface and having a limited circumferential extent,
        screw threads formed in said inner surface for engaging corresponding screw threads of a complementary component, and
        a circumferentially extending groove formed in said inner surface; and at least one rotation-inhibiting member received in said groove, said rotation inhibiting member including:
at least one radially inwardly extending protrusion,
at least one radially outwardly extending projection received in said recess and fixing said rotation-inhibiting member circumferentially within said groove, and
at least one terminal end spaced circumferentially along said rotation-inhibiting member a circumferential distance less than 270 degrees from said radially outwardly extending projection.

20. The assembly of claim 19, wherein said rotation-inhibiting member includes 4 radially inwardly extending protrusions over a 360 degree angular sector.

21. The assembly of claim 19, wherein said rotation-inhibiting member includes at least 4 radially inwardly extending protrusions over a 360 degree angular sector.

22. The assembly of claim 19, wherein said rotation-inhibiting member comprises at a single, unitary member.

23. The assembly of claim 19, wherein said rotation-inhibiting member comprises at least first and second separate sections, each of said first and second sections of said rotation-inhibiting member including at least one radially outwardly extending projection and at least one radially inwardly extending protrusion.

24. The assembly of claim 19, further comprising:
a coupling member operatively connectable to one of the first or second fluid conduits, the coupling member comprising:
an outer circumferential surface,
screw threads formed on said outer circumferential surface and configured to threadably engage said screw threads on said inner surface of said nut, and
a plurality of recesses formed in said outer circumferential surface and sized to engage said at least one protrusion when said coupling member is threadably coupled with said nut.

25. The connecting device of claim 16, wherein at least one of the thickness of the strip is 1 mm to 2 mm, or the height of each protrusion is 1 mm to 2 mm.

* * * * *